United States Patent [19]

Kosaka et al.

[11] 4,397,149
[45] Aug. 9, 1983

[54] VARIABLE THRUST SOLID PROPELLANT ROCKET MOTOR

[75] Inventors: Katsuaki Kosaka, Tokyo; Kazunori Kawasaki, Kawagoe, both of Japan

[73] Assignee: Nissan Motor Company, Limited, Yokohama, Japan

[21] Appl. No.: 263,099

[22] Filed: May 12, 1981

[30] Foreign Application Priority Data

May 13, 1980 [JP] Japan ................................. 55-63562

[51] Int. Cl.[3] ............................ F02K 9/12; F02K 9/26
[52] U.S. Cl. ..................................................... 60/254
[58] Field of Search ............... 60/253, 254, 234, 39.47; 102/381, 287

[56] References Cited

U.S. PATENT DOCUMENTS

| | | | |
|---|---|---|---|
| 2,981,060 | 4/1961 | Barnes | 60/254 |
| 3,067,683 | 12/1962 | Wolf | 60/254 |
| 3,183,665 | 5/1965 | Webb | 102/287 |
| 3,216,193 | 11/1965 | Nagey et al. | |
| 3,286,471 | 11/1966 | Kaplan | 60/254 |
| 3,349,565 | 10/1967 | Williams | 60/39.47 |
| 3,381,476 | 5/1968 | Glick | |
| 3,635,030 | 1/1972 | Schubert et al. | 60/39.47 |
| 3,718,094 | 2/1973 | Bermender | 60/254 |

FOREIGN PATENT DOCUMENTS

| | | |
|---|---|---|
| 1541320 | 10/1968 | France . |
| 54-57800 | 5/1979 | Japan ................................. 60/39.47 |
| 982440 | 2/1965 | United Kingdom . |
| 1162158 | 8/1969 | United Kingdom . |
| 1216200 | 12/1970 | United Kingdom . |
| 1543689 | 4/1979 | United Kingdom . |

*Primary Examiner*—Carlton R. Croyle
*Assistant Examiner*—Jeffrey A. Simenauer
*Attorney, Agent, or Firm*—Schwartz, Jeffery, Schwaab, Mack, Blumenthal & Koch

[57] ABSTRACT

A solid propellant rocket motor devised so as to temporarily increase its thrust at a desired stage of its operation. The motor has a first propellant grain which is fixedly disposed in the combustion chamber and is formed with a hole that intersects an inital burning surface of the grain and a second propellant grain which is slidably and gastightly fitted in the hole of the first grain and is shorter in length than this hole. Initially, the second grain is prevented from moving relative to the first grain by a restraining mechanism including, for example, a plunger protruding into an aft end portion of the aforementioned hole to come into abutment with an end face of the second grain. At a desired moment during operation of the motor, the restraining mechanism can be rendered ineffective by actuating a releasing device, whereby the second grain is forced to move by the combustion gas pressure with the result that an end portion of the inner surface of the first grain defining the hole is exposed and becomes an additional burning surface. Usually the two grains are so shaped and arranged as to constitute a fundamentally end-burning grain.

14 Claims, 6 Drawing Figures

VARIABLE THRUST SOLID PROPELLANT ROCKET MOTOR

BACKGROUND OF THE INVENTION

This invention relates to a solid propellant rocket motor which is fundamentally of the end-burning type but has the capability of considerably increasing its thrust at a desired stage of its operation.

A principal characteristic of solid propellant rocket motors of the end-burning type is the ability of maintaining a practically constant but relatively low level of thrust for a relatively long period of time. Accordingly rocket motors of this type exhibit their utmost merit when used for propulsion of relatively low speed projectiles that need to be steered during flight.

A drawback of end-burning type solid propellant rockets is unstableness of the trajectory during an initial stage of flight immediately after launching by reason of lowness of the initial velocity. As an effective remedy for this drawback, it is known to bore an axial hole in an aft end portion of the end-burning propellant grain to provide an interior burning surface which intersects the primary burning surface at the aft end of the grain to thereby increase the rate of gas generation or mass burning rate, and hence the thrust of the rocket motor at an intial stage of operation.

However, an inherently low level thrust of an end-burning type solid propellant rocket motor offers another problem to a projectile propelled by this rocket motor even at a later stage of the flight. That is, when it is desired to steer the flying rocket projectile so as to achive a relatively large deflection of the flight course, the smallness of the thrust of the rocket motor offers a rather strict limitation on the degree of allowable deflection, and therefore it is not always possible to change the flight course as greatly as and as quickly as desired.

SUMMARY OF THE INVENTION

It is an object of the present invention to provide a solid propellant rocket motor which is so devised as to be able to temporarily increase its thrust at a desired stage of its operation by a temporary increase of the burning surface area.

A solid propellant rocket motor according to the invention comprises a motor case which defines therein a combustion chamber and is provided with a nozzle and a propellant grain which is fixedly disposed in the combustion chamber. This propellant grain (will be referred to as first grain) is formed with a hole which intersects an initial burning surface of this grain. The rocket motor further comprises a second solid propellant grain which is slidably and gastightly fitted in the hole of the first grain but is shorter in length than this hole. An end surface of the second grain exposed to the combustion chamber is uninhibited and accordingly becomes a burning surface. The rocket motor further comprises a restraining means for restraining the second grain from moving relative to the first grain and a releasing means for rendering the restraining means ineffective at a desired moment during operation of the rocket motor thereby allowing the second grain to be moved over a predetermined distance within the aforementioned hole by the pressure of combustion gas in the combustion chamber. The movement of the second grain results in that a portion of the inner surface of the first grain defining the hole is exposed and provides an additional burning surface, and therefore the thrust of the rocket motor increases nearly proportionally to the increase in the total burning surface area.

When the invention is embodied in a fundamentally end-burning type rocket motor, the first or fixed propellant grain will be formed with a lengthwise axial through-hole to become a tubular grain, and a solid cylindrical propellant grain as the second grain is slidably and gastightly fitted into the axial hole in the first grain so as to leave a forward end portion of the hole vacant. The vacant portion of the hole will be occupied by a piston which is gastightly inserted through a hole bored in the forward end wall of the motor case and held in a predetermined position by, for example, a retractable locking pin or a regulatable hydraulic pressure. Upon release of the piston from the restrained state at a desired moment during operation of the rocket motor, there occurs a rapid advance of the second propellant grain together with the piston until the piston reaches a predetermined stop position. Then, in the region rearward of the advanced second grain the tubular first grain burns not only axially but also radially from the exposed inner surface with a resultant increase in the thrust of the rocket motor. When the radial burning surface reaches the outer periphery of the tubular grain, this rocket motor resumes an end-burning mode of function with drop of the thrust to the initial low level.

The aft end face of the movable propellant grain in the initial position may be flush with the aft end face of the fixed propellant grain, or may alternatively be sunk into the hole to increase the thrust during initial stage of the operation.

The restraining and releasing means can be so designed as to repeat a thrust-increasing advance of the second propellant grain a plurality of times during operation of the rocket motor.

Thus the present invention makes it possible to temporarily and greatly increase the thrust of an end-burning type solid propellant rocket motor at a desired stage of its operation and, for example, brings about enlarged freedom of steering of a projectile propelled by this rocket motor. Accordingly the invention is believed to make a great contribution towards expansion of the scope of applications of end-burning type rocket motors.

DESCRIPTION OF THE PREFERRED EMBODIMENTS

Figure 1:
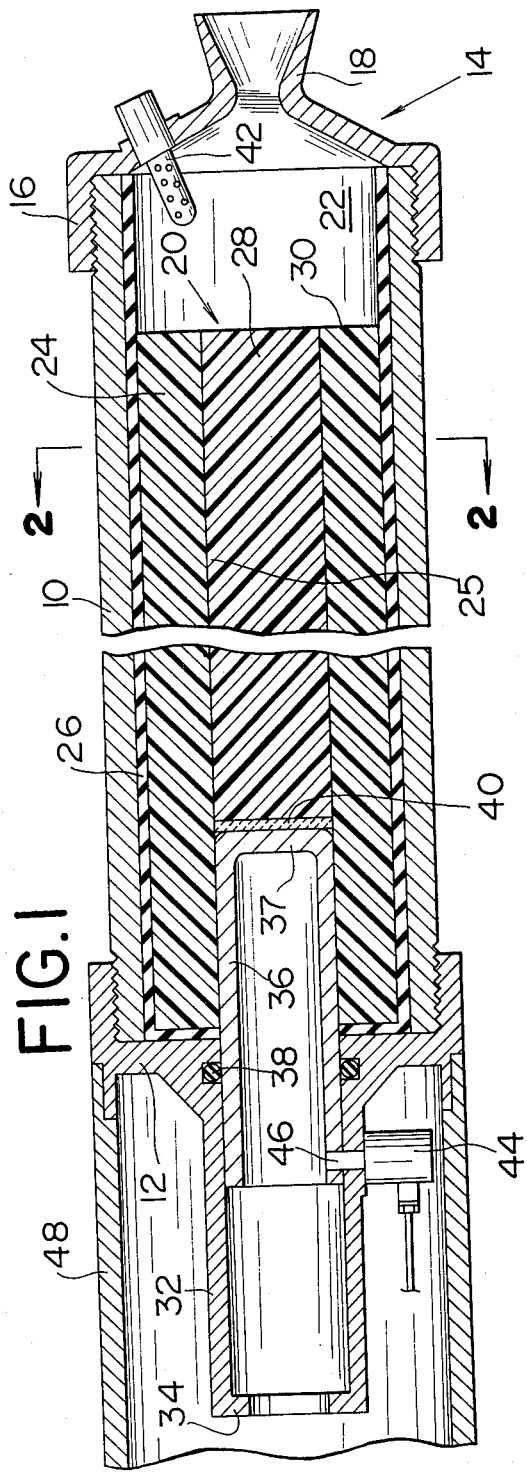
FIG. 1 is a longitudinal sectional view of a solid propellant rocket motor as an embodiment of the present invention, showing the state before ignition of the propellant.
Figure 2:
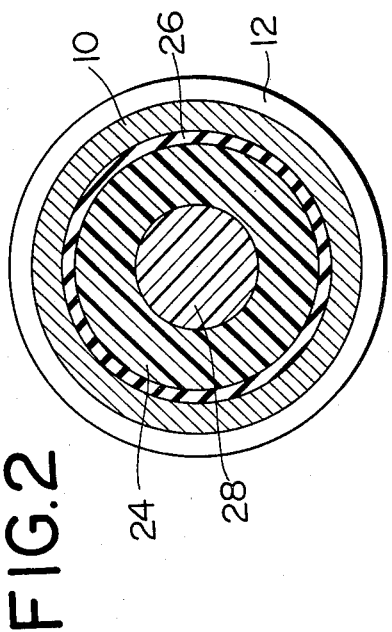
FIG. 2 is a cross sectional view taken along the line 2—2 in FIG. 1.

FIGS. 1 and 2 show a solid propellant rocket motor embodying the present invention, which is fundamentally of the end-burning type but has the capability of temporarily but greatly increasing its thrust at a desired stage of its operation.

Indicated at 10 is a cylindrical motor case. A forward end plate 12 is screwed to the motor case 10 as usual, but this end plate 12 is different in design from the counterparts in conventional solid propellant rocket motors as will later be described in detail. A nozzle assembly 14 constituted fundamentally of a threaded aft-end ring 16 and a nozzle 18 is attached by screwing to the aft end of the motor case 10.

Solid propellant 20, which may be either a double-base propellant or a composite propellant, is loaded in the motor case 10 to occupy a major volume of a combustion chamber 22 defined in the motor case 10. In this rocket motor, the solid propellant 20 consists of a tubular propellant grain 24 which is bonded to the inside of the motor case 10 with a usual insulating and adhering layer 26 and a solid cylindrical propellant grain 28 which is slidably fitted into the central through-hole 25 of the tubular grain 24. The movable propellant grain 28 is somewhat shorter than the tubular grain 24. The forward end plate 12 is bored in its central area and is formed with a hollow cylindrical projection 32 which protrudes into an aft-end region of a payload section 48 of the rocket-propelled vehicle or projectile such that the cylindrical space in this projection 32 is in axial alignment with the hole 25 of the fixed propellant grain 24 and has the same diameter as the hole 25. A cylindrical metal slider 36 is slidably received in the cylindrical projection 32 so as to partly protrude into a forward end portion of the hole 25 of the fixed propellant grain 24. At the aft-end protruding into the hole 25, the slider 36 has a flat and solid wall 37, and a seal means 38 provides a gastight seal between the bored forward end plate 12 and the slider 36. The outer surface of the end wall 37 of the slider 36 is coated with a heat-resistant layer 40, and the movable propellant grain 28 is bonded at its forward end to this coating layer 40 so that the slider 36 and the propellant grain 28 are united together. The cylindrical inner surface of the fixed propellant grain 24 and the cylindrical outer surface of the movable propellant grain 28 are coated with a heat-resistant and lubricating sealant (not illustrated) such as a silicone grease to prevent intrusion of the combustion gas into the gap between these two grains 24, 28 and allow a smooth sliding movement of the movable grain 28 relative to the fixed grain 24. Thus, the propellant grain 28 can make an axial movement within the hole 25 of the fixed propellant grain 24 unless the slider 36 is held stationary.

At the forward end the cylindrical projection 32 which serves as a guide for the slider 36 is formed with a stopper 34 to put a limitation on the axial movement of the slider 36. Initially, the slider 36 is positioned so as to protrude into the hole 25 of the propellant grain 24 to such an extent that the aft end face of the movable propellant grain 28 becomes flush with the annular end face of the fixed propellant grain 24, so that the end faces of the two grains 24, 28 jointly provide a flat and circular initial ignition surface 30. An igniter 42 is attached to the nozzle assembly 14 in the usual manner.

To inhibit movement of the slider 36 until a desired moment, a locking device 44 is mounted on the outer side of the cylindrical guide 32. This device 44 has a sufficiently thick and strong plunger 46 that fits into aligned radial holes (no numeral) bored through the side walls of the cylindrical guide 32 and the slider 36 such that the slider 36 is firmly held in the above described initial position. By way of example, this locking device 44 contains an electrically initiatable explosive charge to serve the function of retracting the plunger 46 from the radial hole in the wall of the slider 36 in response to a command signal thereby releasing the slider 36 from the locked state.

After ignition of the propellant 20 constituted of the two grains 24 and 28 in the state of FIG. 1 at the exposed end surface 30, combustion of the propellant 20 proceeds with steady advance of a substantially flat and circular burning surface parallel to the initial ignition surface 30. That is, the propellant 20 burns in the cigarette fashion and this rocket motor continues to provide a substantially constant thrust as the feature of an end-burning type rocket motor.

Figure 3:
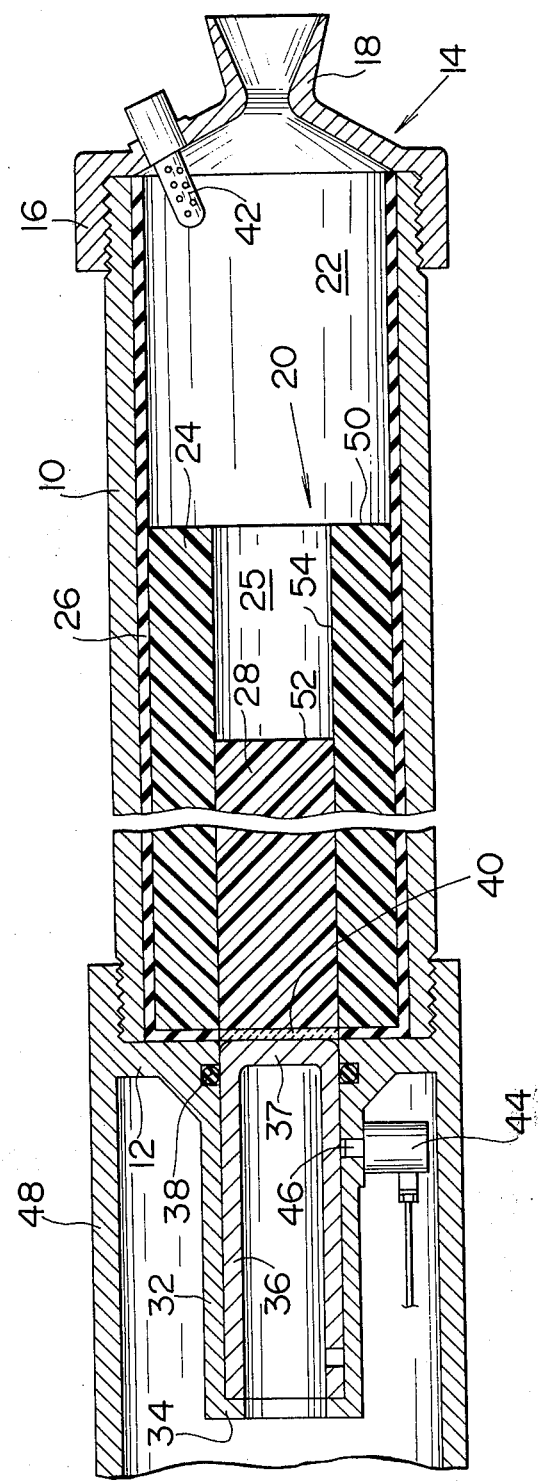
FIG. 3 shows the rocket motor of FIG. 1, in the same longitudinal sectional view, in a state at the moment of the function of a thrust increasing device comprised in this rocket motor during operation of the motor.

Referring to FIG. 3, when it is desired to temporarily increase the thrust of this rocket motor during its operation, the locking device 44 is actuated by a command signal, which may be sent out from a ground station or alternatively provided by an onboard instrument, so as to retract the plunger 46 to thereby make the slider 36 movable. Then the union of the movable propellant grain 28 and the slider 36 is forced to rapidly move axially forwardly by the high pressure of the combustion gas in the combination chamber 22 until the forward end of the slider 36 collides against the stopper 34 at the forward end of the cylindrical projection or guide 32. As a consequence, an aft end portion of the hole 25 in the partly burnt fixed propellant grain 24 becomes vacant as illustrated in FIG. 3, and in this portion of the hole 25 the cylindrical inner surface 54 of the fixed propellant grain 24 is soon ignited by the high temperature combustion gas existing in the combustion chamber 22. At this stage, the initially circular burning surface is divided into the annular end face 50 of the fixed grain 24 and the circular end face 52 of the movable grain 28 and is added with the cylindrical surface 54 of the fixed grain 24. Therefore, the thrust of this rocket motor increases practically instantaneously at a rate of increase approximately equal to the proportion of the area of the cylindrical burning surface 54 to the area of the circular initial burning surface 30 in FIG. 1 (50+52 in FIG. 3). As will be understood, the diameter of the hole 25 of the fixed propellant grain 24 and the length of the cylindrical burning surface 54, i.e. the extent of the forward movement of the released slider 36, are appropriately predetermined so as to achieve a desired rate of increase in the thrust upon movement of the propellant grain 28.

For a short period of time immediately after the advance of the movable propellant grain 28 in the above described manner, the mode of function of this rocket motor becomes a combination of end-burning and interior-burning because the aft end portion of the fixed propellant grain 24 burns not only axially but also radially outwardly. The manner of variations of the effective burning surface area and hence the thrust of the rocket motor during this time period will be explained with reference to FIGS. 4 and 5, assuming that the two propellant grains 24 and 28 are identical in burning rate.

Figure 4:
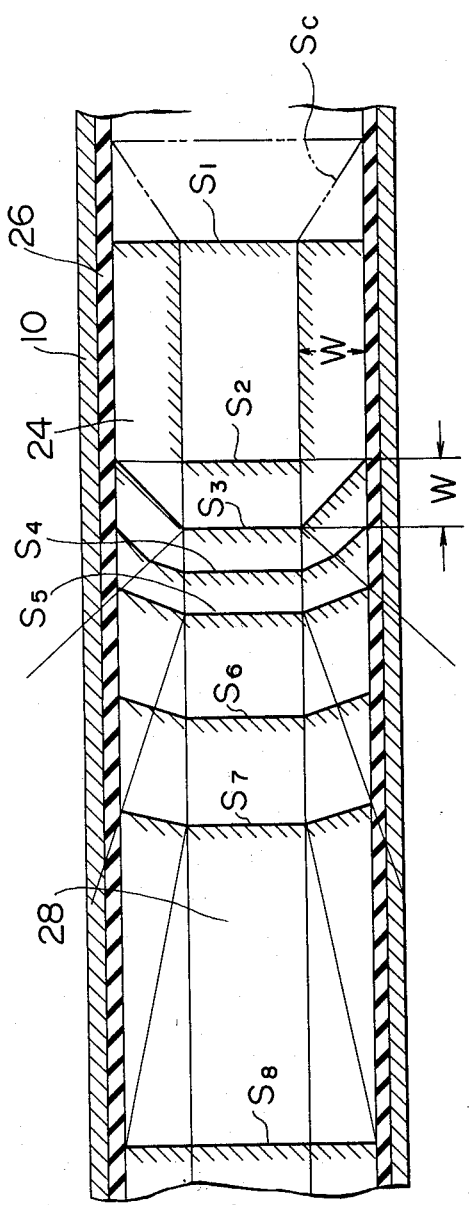
FIG. 4 is a diagram illustrating variations in the configuration of the burning surface in the rocket motor of FIGS. 1–3.
Figure 5:
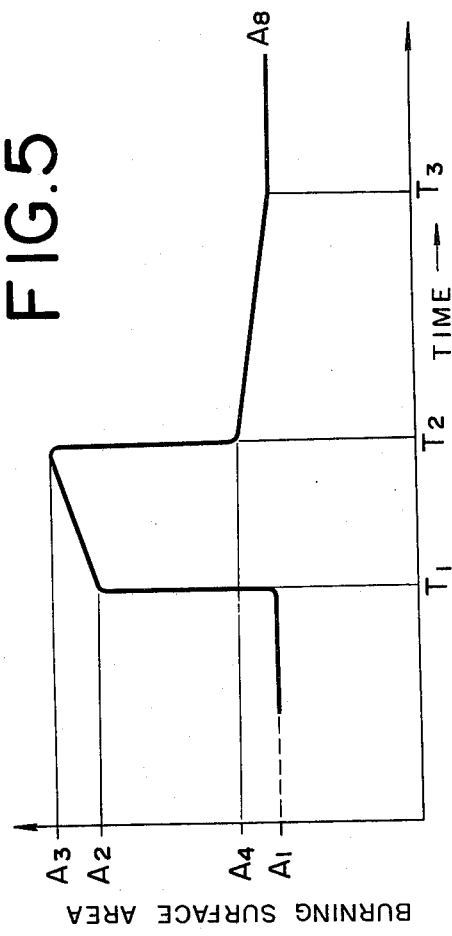
FIG. 5 is an explanatory graph showing the manner of variations of the burning surface area with time as the effect of the thrust increasing device in the rocket motor of FIGS. 1–3.

In FIG. 4, indicated at $S_1$ is a flat and circular burning surface that exists in the rocket motor of FIGS. 1-3 before the advance of the movable propellant grain 28. In FIG. 5, burning surface area $A_1$ represents the area of this flat and circular burning surface $S_1$. It is assumed that the device 44 in FIG. 3 is actuated at time point $T_1$ in FIG. 5 corresponding to the position of the burning surface $S_1$ in FIG. 4. As the result of a rapid advance of the propellant grain 28, the circular burning surface $S_1$ varies almost instantaneously to a considerably larger burning surface $S_2$ which includes the cylindrical surface defining the aft end portion of the hole 25. In FIG. 5, burning surface area $A_2$ represents the area of the burning surface $S_2$ at the moment of completion of the advance of the propellant grain 28.

Thereafter, the fixed propellant grain 24 burns axially from its annular end face and also radially outwardly from its cylindrical inner surface with a gradual increase in the total burning surface area of this grain 24, while the movable grain 28 continues to undergo cigarette fashion burning with the maintenance of a constant burning surface area. However, the cylindrical burning surface of the grain 24 vanishes when the radial combustion front reaches the outer periphery of this grain 24. Therefore, the total burning surface area in the combustion chamber 22 becomes maximal, as represented by area $A_3$ in FIG. 5, just before arrival of the radial combustion front at the outer periphery of the grain 24 and immediately exhibits a sharp and considerable decrease, as shown at time point $T_2$ in FIG. 5, to give a burning surface $S_3$ consisting of a flat and circular central region and a generally conical marginal region and having a total area $A_4$. Thus, a considerably increased level of thrust is maintained during the time period $T_2-T_1$ which is given by dividing the web thickness W (mm) of the fixed tubular grain 24 by the burning rate (mm/sec) of this propellant grain 24. Accordingly the time-thrust characteristic after the advance of the movable grain 28 can desirably be prescribed by appropriately determining the web thickness W of the fixed propellant grain 24.

As the combustion proceeds further, there occurs a gradual change in the shape and area of the marginal region of the burning surface $S_3$ as represented in FIG. 4 by burning surfaces $S_4$, $S_5$, $S_6$, $S_7$, until establishment of a substantially flat and circular burning surface $S_8$ similar to the initial burning surface $S_1$ at time point $T_3$ in FIG. 5. That is, the area $A_8$ of this burning surface $S_8$ equals to the initial burning surface area $A_1$. As can be seen in FIG. 5, the total burning surface area of the propellant 20 continues to gradually decrease during the time period $T_3-T_2$. In practice, however, this rocket motor can be regarded as to resume the end-burning mode of function at the time point $T_2$ because of very small rate of decrease in the burning surface area during this time period.

When the fixed propellant grain 24 and the movable propellant grain 28 are different in composition so that the latter grain 28 is higher in burning rate than the former grain 24 by way of example, the initially annular burning surface of the fixed grain 24 varies to a conical burning surface as indicated in FIG. 4 by phantom line $S_c$ as the combustion proceeds while the movable grain 28 is still held in the initial position. The angle of vertex of this conical burning surface $S_c$ depends on the difference between the burning rates of the respective propellant grains 24 and 28 and becomes smaller as the difference is greater. In such a case, there occurs some increase in the thrust of the rocket motor shortly after ignition. It will be understood that even in this case the thrust can further be increased sharply and greatly at a desired time point by causing the movable grain 28 to advance in the above described manner. In this case, a conical burning surface identical with the illustrated burning surface $S_c$ is resumed after vanishment of the generally cylindrical inner burning surface of the fixed propellant grain 24.

Figure 6:
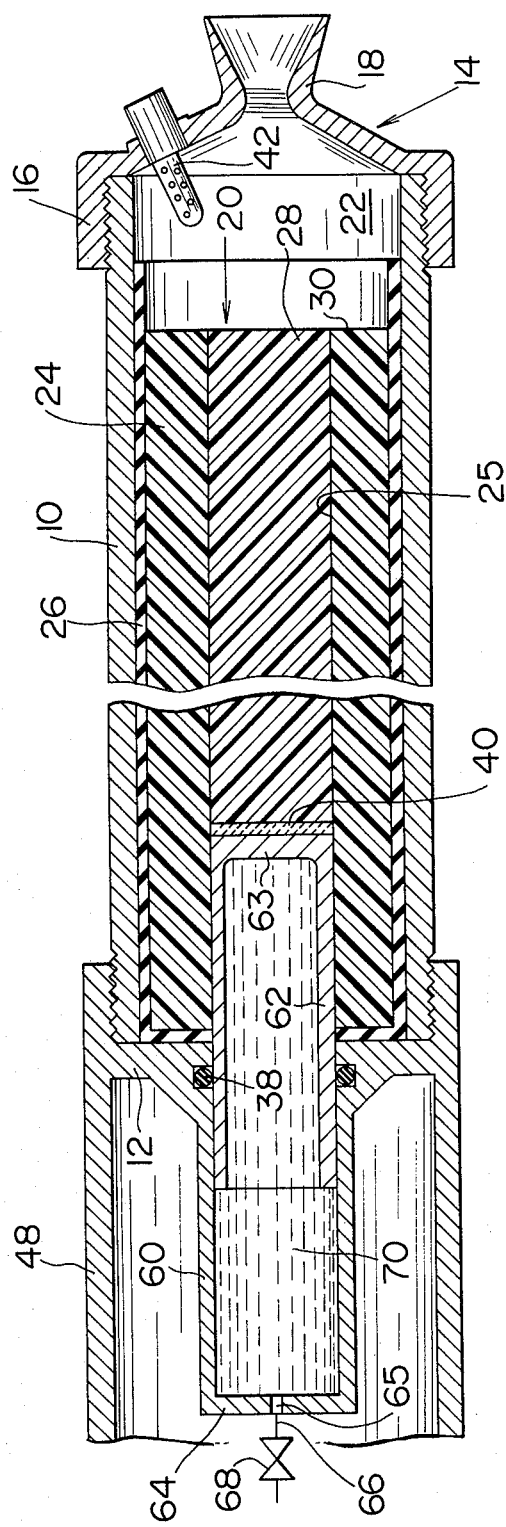
FIG. 6 is a longitudinal sectional view of a solid propellant rocket motor as another embodiment of the invention.

FIG. 6 shows another rocket motor according to the invention, which is fundamentally similar to the rocket motor of FIG. 1 but employs different type of restraining and releasing means for the movable propellant grain 28.

The forward end plate 12 of this rocket motor is bored in its central region and is formed with a hollow cylindrical projection 60, which protrudes into an aft-end portion of the payload section 48 such that the cylindrical space in this projection 60 is in axial alignment with the hole 25 in the fixed propellant grain 24 and has the same diameter as the hole 25. A cylindrical piston 62 is slidably received in the projection 60 so as to partly protrude into a forward end portion of the hole 25, and a seal means 38 provides gastight seal between the bored end plate 12 and the piston 62. A flat bottom 63 of the piston 62 is coated with a heat-resistant layer 40, to which the movable propellant grain 28 is bonded. The cylindrical projection 60 has a forward end wall 64 and is so designed as to serve as a hydraulic cylinder. The end wall 64 is formed with a port 65, and the interior of the cylinder 60 and the piston 62 (in the case of a hollow piston as illustrated) is filled with a hydraulic liquid 70. A conduit 66 connected to the port 65 as a liquid passageway is provided with a flow control valve 68, for example of an electromagnetic type, which is normally closed but can be opened in response to a command signal.

The liquid 70 in the cylinder 60 offers a resistance against the combustion gas pressure acting on the movable propellant grain 28, so that the grain 28 burns in the illustrated position without advancing. When it is desired to advance the grain 28 to temporarily increase the thrust of this rocket motor, the control valve 68 is opened to allow the liquid 70 to be forced out of the cylinder 60 by the forwardly thrusting force of the piston 62 attributed to the combustion gas pressure. Then, there occurs rapid advance of the propellant grain 28 with resultant increase in the total burning surface area and the thrust as explained with respect to the embodiment illustrated in FIGS. 1-3. When the piston 62 is allowed to reach the end wall 65 of the cylinder 60 in one stroke, the manner of variations in the burning surface area and the thrust is in accordance with the explanation given with reference to FIGS. 4 and 5.

In the rocket motor of FIG. 6, however, it is also possible to terminate the advance of the propellant grain 28 while the forward end of the piston 62 is yet considerably distant from the end wall 64 of the cylinder 60 by appropriately controlling the valve 68. Then, a temporary increase of the thrust by such a limited extent of advance of the grain 28 can be repeated once more, or more times, after the lapse of a desired length of time from the first time advance of the grain 28, though the increase of the thrust at each time of advance of the grain 28 is limited to a relatively small extent.

When a rocket utilizing the present invention is desired to have a relatively high initial velocity, the initial position of the movable propellant grain may be determined such that the aft end face of the movable grain lies in the interior of the hole of the fixed propellant grain to leave the inner surface of the first grain exposed over a suitable length from its aft end.

Besides, a rocket motor according to the invention may have a plurality of movable propellant grains each of which is slidably fitted into a hole bored in a fixed propellant grain with the provision of restraining and releasing means, and in such a case the movable grains may be advanced either simultaneously or individually.

What is claimed is:

1. A solid propellant rocket motor comprising:
   a motor case which defines therein a combustion chamber and is provided with a nozzle;
   a first propellant grain fixedly disposed in the combustion chamber and formed with a hole which intersects an initial burning surface of the grain;
   a second propellant grain which is slidably and gastightly fitted in said hole of the first grain and is shorter in length than said hole, an end surface of the second grain exposed to the combustion chamber being uninhibited to become a burning surface;
   restraining means for restraining the second propellant grain from moving relative to the first propellant grain; and
   releasing means for rendering the restraining means ineffective at a desired moment during operation of the rocket motor thereby allowing the second grain to be moved over a predetermined distance within said hole by the pressure of combustion gas in the combustion chamber such that a portion of the inner surface of the first grain defining said hole is exposed and provides an additional burning surface.

2. A rocket motor according to claim 1, wherein said first propellant grain is an elongate grain in which said hole is bored lengthwise axially through the entire length of the grain, the initial position of said second propellant grain in said hole being such that the combination of said first and second grains provides a fundamentally end-burning grain.

3. A rocket motor according to claim 1 or 2, wherein said end surface of said second propellant grain in the initial position is flush with said initial burning surface of said first propellant grain.

4. A rocket motor according to claim 1 or 2, wherein said end surface of said second propellant grain in the initial position lies in the interior of said hole at a distance from said initial burning surface of said first grain such that an aft end portion of said hole is left vacant.

5. A rocket motor according to claim 2, wherein said restraining means includes a plunger which slidably and gastightly passes through an aperture formed in a forward end wall of the motor case and slidably and gastightly protrudes into a forward end portion of said hole of said first grain so as to come into abutment with the forward end face of said second grain and a holding means for holding said plunger in a predetermined position until operation of said releasing means.

6. A rocket motor according to claim 5, wherein said holding means comprises a tubular guide which is fixedly formed on the outer side of said end wall of the motor case such that said plunger can slidably protrude into said tubular guide and a locking pin fitted into a hole bored in said plunger through a hole bored in a side wall of said tubular guide, said releasing means comprising an electrically actuatable retracting means for pulling said locking pin out of said plunger.

7. A rocket motor according to claim 6, wherein said tubular guide has a stopper at a forward end portion thereof to limit the movement of said plunger caused by the action of said releasing means.

8. A rocket motor according to claim 6, wherein said retracting means is a pyrotechnic device.

9. A rocket motor according to claim 5, wherein said holding means comprises a hollow cylinder which is fixedly formed on the outer side of said end wall of the motor case such that said plunger can slidably protrude into said cylinder and a liquid with which the interior of said cylinder is filled up, said releasing means comprising a normally closed and electrically operatable flow control valve which is associated with a port formed in a wall of said cylinder.

10. A rocket motor according to claim 1, wherein said first and second propellant grains have the same burning rate.

11. A rocket motor according to claim 1, wherein said first and second propellant grains are different in burning rate.

12. A rocket motor according to claim 11, wherein said second propellant gain is higher in burning rate than said first grain.

13. A rocket motor according to claim 1, wherein said first and second propellant grains are made of a double-base propellant.

14. A rocket motor according to claim 1, wherein said first and second propellant grains are made of a composite propellant.

* * * * *